ical Patent Number: 5,071,997

United States Patent [19]
Harris

[11] Patent Number: 5,071,997
[45] Date of Patent: Dec. 10, 1991

[54] POLYIMIDES COMPRISING SUBSTITUTED BENZIDINES

[75] Inventor: Frank W. Harris, Akron, Ohio

[73] Assignee: University of Akron, Akron, Ohio

[21] Appl. No.: 382,435

[22] Filed: Jul. 20, 1989

[51] Int. Cl.$^5$ ............................................. C08G 69/26
[52] U.S. Cl. .................................... 528/353; 528/125; 528/126; 528/128; 528/172; 528/173; 528/174; 528/176; 528/188; 528/220; 528/229; 528/350; 528/351; 428/395; 428/473.5
[58] Field of Search ................ 528/353, 125, 126, 128, 528/172, 351

[56] References Cited

U.S. PATENT DOCUMENTS

| | | | |
|---|---|---|---|
| 4,239,880 | 12/1980 | Darms | 528/125 |
| 4,384,107 | 5/1983 | Rogers et al. | 528/183 |
| 4,461,886 | 7/1984 | Rogers et al. | 528/331 |
| 4,461,888 | 7/1984 | Rogers et al. | 528/363 |
| 4,473,523 | 9/1984 | Sasaki et al. | 528/353 |
| 4,485,140 | 11/1984 | Gannett et al. | 528/353 |
| 4,530,993 | 7/1985 | Jinda et al. | 528/353 |
| 4,629,777 | 12/1986 | Pfeifer | 528/353 |
| 4,921,728 | 5/1990 | Takiguichi et al. | 427/331 |

FOREIGN PATENT DOCUMENTS 3727945 2/1988 Fed. Rep. of Germany .

OTHER PUBLICATIONS

Rogers et al., "Highly Amorphous, Birefringent, Para-Linked Aromatic Polyamides", Macro., vol. 18, pp. 10-58-1068, 1985.

*Primary Examiner*—Maurice J. Welsh
*Assistant Examiner*—P. Hampton Hightower
*Attorney, Agent, or Firm*—Oldham & Oldham Company

[57] ABSTRACT

A new class of polyimides and copolyimides made from substituted benzidines and aromatic dianhydrides and other aromatic diamines. The polyimides obtained with said diamines are distinguished by excellent thermal, excellent solubility, excellent electrical properties such as very low dielectric constants, excellent clarity and mechanical properties making the polyimides ideally suited as coating materials for microelectronic apparatii, as membranes for selective molecular or gas separation, as fibers in molecular composites, as high tensile strength, high compression strength fibers, as film castable coatings, or as fabric components.

22 Claims, No Drawings

POLYIMIDES COMPRISING SUBSTITUTED BENZIDINES

This invention was made with government support under contract NAG-1-448 awarded by NASA. The government has certain rights in this invention.

TECHNICAL FIELD

This invention relates to a novel class of polyimides exhibiting superior thermal, solubility, electrical and mechanical properties. More particularly, it relates to a class of polyimides comprising substituted benzidines where said substituents are sufficient to provide said benzidine with a non-coplanar molecular orientation such as halogen, alkyl, nitro, cyano, thioalkyl, alkoxy, aryl and substituted-alkyl such as halogenated-alkyl and especially trifluoromethyl.

The polyimides of the present invention are solution castable, form high clarity films, have excellent thermal stability, form films with extremely low dielectric constants and low coefficients of thermal expansion ideally suited for coatings in microelectronics and can be spin drawn to form fibers with excellent tensile and compressive strengths. The polyimides of the present invention are also usable as reinforcing agents for molecular composites and as components in gas and/or molecular separation membranes.

BACKGROUND ART

Polyimides are also useful as components which require excellent thermal, electrical and/or mechanical properties. For general discussion of polyimides preparation, characterization and applications see *Polyimides, Synthesis. Characterization and Applications,* L. Mittal, ed Plenum, NY 1984.

Polyimides based on pyromellitic dianhydride and various organic diamines are disclosed in U.S. Pat. No. 4,485,140 to Gannett et al (E.I. DuPont de Nemours and Co.).

Polyimides based on diamines such as 2,2'-di-(p-aminophenyloxy)-diphenyl and various dianhydrides are disclosed in U.S. Pat. No. 4,239,880 to Darms (Ciba-Geigy Corp.).

Harris et al. in U.S. Pat. Application Ser. No. 07/315,327, has disclosed the preparation of soluble polyimides based on 3,6-diarylpryomellitic dianhydride and various diamines including the diamines of the present invention. The polyimides taught in this reference lack the clarity of the present polyimides and are more expensive to prepare and lack the versatility of the polyimides described herein.

However, the polyimides derived from the above cited references lack consistency in satisfactory properties to be used a high clarity, low dielectric constant coating materials or in high compression strength fiber or fabric application.

DISCLOSURE OF THE INVENTION

We have discovered that it is desirable to produce polyimides and copolyimides based on substituted benzidines, where the substituents are sufficient to provide said benzidines with a non-coplanar molecular orientation, which have high clarity, high molecular weight, high solubility, and excellent properties as protective coatings for microelectronics such as very low dielectric constant and high thermal stability, or as solution castable films, or as membranes for molecular and gas separations, or as components in molecular composites, or as fibers.

It is an object of this invention to provide novel, thermally stable, generally soluble polyimides with low dielectric constants, and low thermal coefficients of expansion for use as microelectronic film coatings, with high tensile strength, high compressive strength and spin drawable, usually two or more times, to form non-fibrillating fibers for use in molecular composites and for use in reinforcing fabrics for such applications fabric reinforced elastomeric or resinous products used in tire, belts or hose construction or other related areas based on substituted benzidines of formula (I):

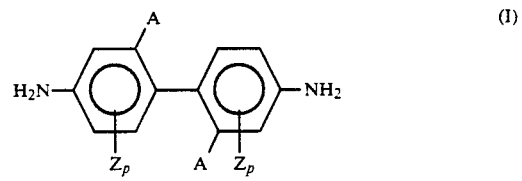

where each A is a substituent other than H, each Z is a H or substituent other than H and each P is an integer having a value of 1 to 3, said A and Z being present in sufficient amount to provide said diamine of formula (I) with a non-coplanar molecular structure. It is to be understood that the word substituent used herein to define A and Z are to be selected from the representative group consisting of halogen, viz. fluoride, chloride, iodide and bromide; alkyl, substituted-alkyl such as halogenated alkyls, nitro, cyano, thioalkyl, alkoxy, aryl or substituted-aryl such as halogenated aryls. Further, it is understood that the term copolyimide as used in this application and the claims is not limited to polyimides containing only two different repeat units, but is intended to include any polyimide having two or more different repeat units. Thus, a copolyimide of the present invention can be made with a diamine of formula (I) and an organic dianhydride or its equivalent, with two or more diamines of formula (I) and an organic dianhydride or its equivalent, with a diamine of formula (I) and two or more organic dianhydrides or their equivalents, with a diamine of formula (I) and two or more organic diamines other than diamines of formula (I) and an organic dianhydride, with a diamine of formula (I), two or more organic dianhydrides and two or more organic diamines, or any combination thereof.

A further object of this invention is to provide novel polyimides comprising repeat units based on diamines of formula (I) and organic dianhydrides of tetravalent carboxylic acids or their derivatives particularly the diacid-diester derivative.

A further object of this invention is to provide novel polyimides consisting of 100 mole percent of repeat units based on diamines of formula (I) and one or more organic diacid-diesters of tetravalent carboxylic acids which are of particular importance in the manufacture of molecular composites.

A further object of this invention is to provide novel polyimides consisting of 100 mole percent of repeat units based on diamines of formula (I) and one or more organic dianhydrides or organic diacid-diesters.

A further object of this invention is to provide novel polyimides or copolyimides consisting of 1-100 mole percent of repeat units based on diamines of formula (I) and one or more organic dianhydride or tetravalent organic diacid-diester and 99-0 mole percent of repeat units based on one or more organic diamine and one or more organic dianhydride or tetravalent organic diacid-diester.

A further object of this invention is to provide novel polyimides or copolyimides consisting of 1-100 mole percent of repeat units based on diamines of formula (I), one or more organic dianhydride or tetravalent organic diacid-diester, and 99-0 mole percent of repeat units based on one or more organic diamines other than a diamine of formula (I) and one or more organic dianhydride or tetravalent organic diacid-diester.

A further object of this invention is to provide novel copolyimides consisting of 1-50 mole percent of repeat units based on diamines of formula (I), one or more organic dianhydride or tetravalent organic diacid-diester and 99-50 mole percent of repeat units based on one or more organic diamine and one or more organic dianhydride or tetravalent organic diacid-diester. Particularly preferred copolyimides consist of 10-50 mole percent of repeat units based on diamines of formula (I), one or more organic dianhydride or tetravalent organic diacid-diester and 90-50 mole percent of repeat units based on one or more organic diamine and one or more organic dianhydride or tetravalent organic diacid-diester.

A further object of this invention is to provide novel copolyimides consisting of 1-50 mole percent of repeat units based on diamines of formula (I) one or more organic dianhydride or tetravalent organic diacid-diester and 99-50 mole percent of repeat units based on one or more organic diamines other than a diamine of formula I and one or more organic dianhydride or tetravalent organic diacid-diester. Particularly preferred copolyimides consist of 10-50 mole percent of repeat units based on diamines of formula (I), one or more organic dianhydride or tetravalent organic diacid-diester and 90-50 mole percent of repeat units based on one or more organic diamines other than a diamine of formula I and one or more organic dianhydride or tetravalent organic diacid-diester.

A further object of this invention is to provide novel polyimides or copolyimides consisting of 51-100 mole percent of repeat units based on diamines of formula (I), one or more organic dianhydride or tetravalent organic diacid-diester and 49-0 mole percent of repeat units based on one or more organic diamine and one or more organic dianhydride or tetravalent organic diacid-diester.

A further object of this invention is to provide novel polyimides or copolyimides consisting of 51-100 mole percent of repeat units based on diamines of formula (I), one or more organic dianhydride or tetravalent organic diacid-diester and 49-0 mole percent of repeat units based on one or more organic diamines other than a diamine of formula I and one or more organic dianhydride or tetravalent organic diacid-diester.

A further object of this invention is to provide a class of m-cresol or N-methylpyrrolidone (NMP) soluble homo- and co-polyimides incorporating at least one mole percent of a repeat unit of formula (II).

A further object of this invention is to provide a class of m-cresol soluble homo- and co-polyimides incorporating at least one mole percent of a repeat unit of formula (II).

A further object of this invention is to provide a class of homo- and co-polyimides incorporating at least one mole percent of a repeat unit of formula (II) which can be spun into a fiber form from a solution of a polar protic organic solvent such as m-cresol or a polar aprotic organic solvent such as NMP.

A further object of this invention is to provide a process for spinning a fiber of the class of homo- and co-polyimides incorporating at least one mole percent of a repeat unit of formula (II) which can be spun into a fiber form from a solution of a polar protic organic solvent such as m-cresol or a polar aprotic organic solvent such as NMP. The spun fibers can be used as is or can be subjected to a drawing process, wherein the drawing ratio is at least two. As the term "draw ratio" is used in the present invention, the term is meant to indicate the number of times the original fiber length has been increased. Thus, a draw ratio of 2 will result in a doubling of the fiber's original length.

The diamines of this invention can be used as polycondensation components for the manufacturing of novel homopolyimides and copolyimides which consist of 1-100 mole percent of the following repeat unit formula (II):

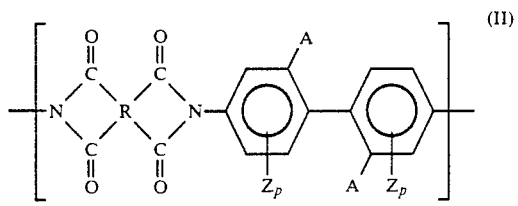

and of 0-99 mole percent of the following repeat unit of formula (III):

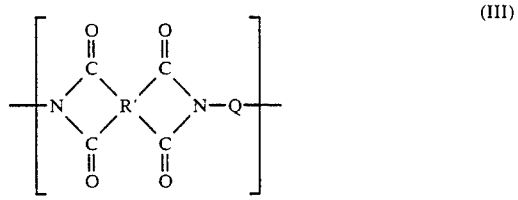

where R is a tetravalent organic radical, A, Z and $_p$ are as previously described, R' is one or more tetravalent organic radical and Q is one or more divalent organic radical including diamines of formula (I).

Although the above polyimides and copolyimides as described do not have end groups or indicate what end groups are present, end groups are present and the nature of the end groups are controlled by the reaction conditions or are determined by the addition of capping reagents. Thus, the end groups can be either an amino group or an anhydride group or a combination thereof depending on the exact molecular composition of the starting reagents as well as the course of a random condensation polymerization.

In certain cases, a terminating agent can be employed to force the termination of a growing polyimide or copolyimide. These agents are often used to control the molecular weight of the polymer by reducing the ultimate length of the polymer chains. These agents can be either simple anhydrides or simple amines. Because these agents are mono-functional, they will cause the growing polymer chain to be capped with the particular agents employed. This technique is well known in the art and is used in most polymerization reactions to control molecular weight or to add end functionality of the resulting polymer.

Anhydrides which are useful as capping or chain terminating agents are selected from the representative and illustrative group consisting of aromatic anhydrides such as phthalic anhydride.

Amines which are useful as capping agents are selected from the representative and illustrative group consisting of aromatic amines such as aniline, methyl anilines, dimethyl anilines or naphthylamines.

In general, polyimides can be prepared by three alternate pathways as shown graphically below:

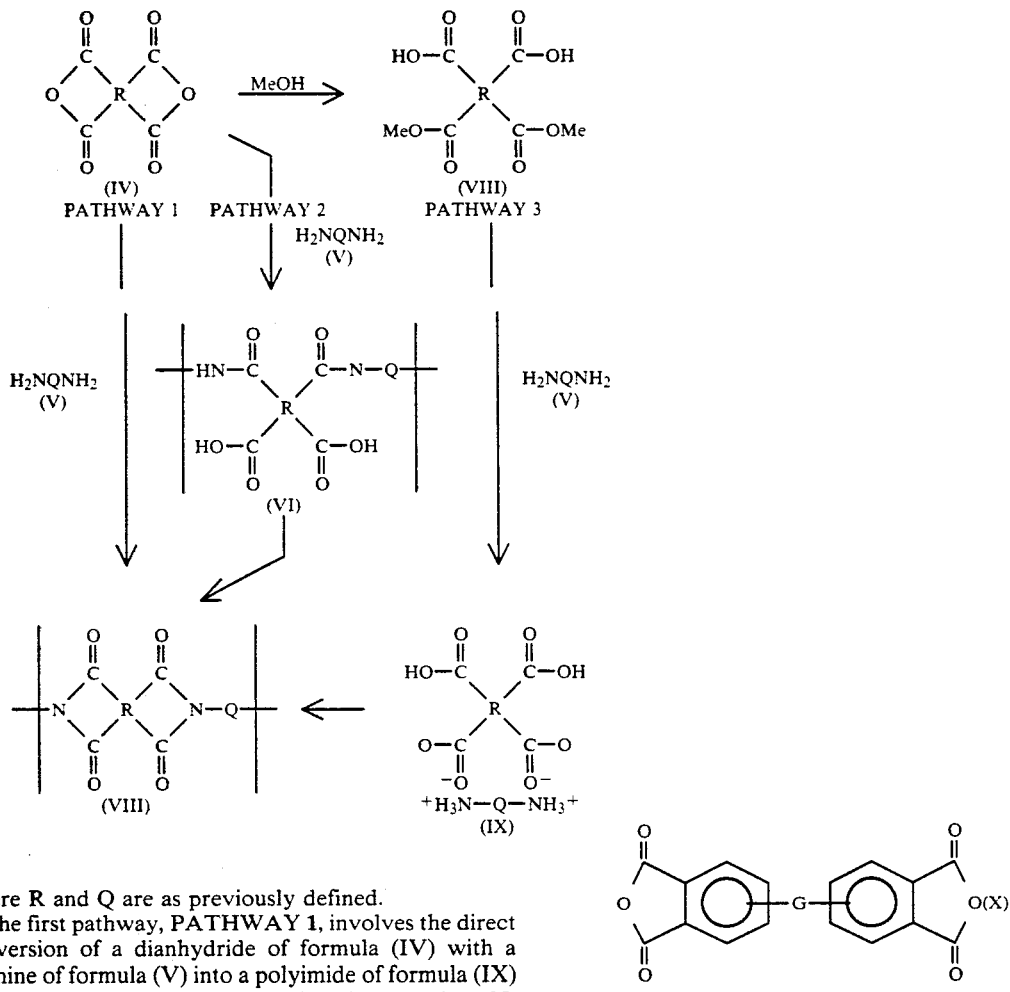

where R and Q are as previously defined.

The first pathway, PATHWAY 1, involves the direct conversion of a dianhydride of formula (IV) with a diamine of formula (V) into a polyimide of formula (IX) in an appropriate refluxing organic solvent such as N-methylpyrrollidone (NMP), m-cresol, or other polar aprotic solvents. A particularly preferred method includes a small amount of solvent of isoquinoline, usually from about 0.1 to 5 percent by weight. However, isoquinoline is an optional additive and is only a preferred additive to facilitate polymerization.

The second pathway, PATHWAY 2, involves reacting a dianhydride of formula (IV) with a diamine of formula (V) to form a intermediate polyamide acid of formula (VI). The polyamide acid of formula (VI) can be chemically or thermally dehydrated to a polyimide of formula (VII).

The third pathway, PATHWAY 3, involves reacting a dianhydride of formula (IV) with two equivalences of a linear, low molecular weight alcohol such as methanol or ethanol, to form a diester-diacid of formula (VIII). The diester-diacid reacts with a diamine of formula (V) to form a salt of formula (IX) which can be thermally cyclized to a polyimide of formula (VII) with loss of water and the appropriate alcohol.

In general, standard polyimides formed from dianhydrides of formula (VI) are selected from the representative and illustrative group consisting of: benzene dianhydrides such as pyromellitic dianhydride; tetracarboxylic acid dianhydrides of formula (X)

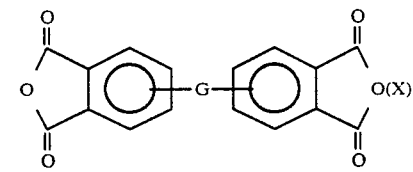

where G is selected from the representative and illustrative group consisting of a covalent or linking bond, a $CH_2$ group, a $C(CH_3)_2$ group, a $C(CF_3)_2$ group, a CO group, an O atom, a S atom, a $SO_2$ group, a $Si(CH_2CH_3)_2$ group or $N(CH_3)$ group. Representative and illustrative examples of these useful anhydrides in the invention are 3,3',4,4'-benzophenone tetracarboxylic acid dianhydride, 2,3,3',4'-benzophenone tetracarboxylic acid dianhydride, 2,2',3,3'-benzophenone tetracarboxylic acid dianhydride, 3,3',4,4'-biphenyl tetracarboxylic acid dianhydride, bis(2,3-dicarboxyphenyl) methane dianhydride, bis(2,5,6-tri-fluoro-3,4-dicarboxyphenyl)methane dianhydride, 2,2-bis(2,3-dicarboxyphenyl)-propane dianhydride, 2,2-bis(2,3-dicarboxyphenyl)-1,1,1,3,3,3-hexafluoropropane dianhydride, bis(3,4-dicarboxyphenyl) ether dianhydride, bis(3,4-dicarboxyphenyl) sulfone dianhydride, N,N-(3,4-dicarboxyphenyl)-N-methylamine dianhydride, bis(3,4- dicarboxyphenyl)-diethylsilane dianhydride; naphthalene tetracarboxylic acid dianhydrides such as 2,3,6,7- and 1,2,5,6-naphthalene-tetracarboxylic acid dianhydride, 2,6-dichloronaphthalene-1,4,5,8-tetracarboxylic acid dianhydride; or heterocyclic aromatic tetracarboxylic acid dianhydrides such as thiophene-2,3,4,5-tetracarboxylic acid dianhydride, pyrazine-2,3,5,6-tetracarboxylic acid dianhydride and pyridine-2,3,5,6-tetracarboxylic acid dianhydride.

And in general, standard polyimides are formed from diamines of formula (VII) selected from the representative and illustrative group consisting of: aliphatic diamines such as 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 2,2-dimethylpropylenediamine, 2,5-dimethyl hexamethylenediamine, 4,4-dimethylheptamethylenediamine, 3-methylheptamethylenediamine, 3-methoxyhexamethylenediamine, 2,11-diminododecane, 2,2,4- and 2,4,4-trimethylhexamethylenediamine, 1,2-bis-(3-aminopropoxy)ethane, N,N'-dimethylethylenediamine and N,N'-dimethyl-1,6-diaminohexane. The amino terminated polyethers or formula (XII)

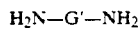

$$H_2N—G'—NH_2 \qquad (XII)$$

where G' is selected from the representative illustrative group consisting of: $(CH_2)_3O(CH_2)_2O(CH_2)_3$ and $(CH_2)_3S(CH_2)_3$; cycloaliphatic diamines such as 1,4-diaminocyclohexane or 1,3-diaminocyclohexane; benzene diamines such as o-, m-and p-Phenylenediamine, 2,4-diaminotoluene, 1,4-diamino-2-methoxybenzene, 2,5-diaminoxylene, 1,3-diamino-4-chlorobenzene, 1,4bis(2-methyl-4-aminopentyl)-benzene and 1,4-bis-(aminomethyl)-benzene are useful in this invention. Other useful poly aromatic diamines in our invention have formula (XI)

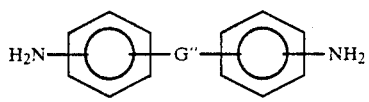

(XI)

where G" is selected from the representative and illustrative group consisting of a covalent or linking bond, a $CH_2$ group, a $C(CH_3)_2$ group, a $C(CF_3)_2$ group, a CO group, an O atom, a S atom, a $SO_2$ group, NH—CO—NH group or $N(CH_3)$ group such as 4,4'-diaminobiphenyl, 4,4'-diaminodiphenylmethane, 2,2-bis(4-diaminophenyl) propane, 4,4'-diaminodiphenyl ether, 4,4'-diaminodiphenyl thioether, 4,4'-diaminodiphenyl sulfone, 2,2'-diaminobenzophenone, and 4,4'-diaminodiphenyl urea; naphthalene diamines such as 1,8- and 1,5-diminonaphthalene; or hetero cyclic aromatic diamines such as 2,6-diaminopyridine, 2,4-diaminopyrimidine, and 2,4-diamino-s-triazine.

Polyimides comprising 100 mole percent of repeat unit of formula (II) are especially interesting because of the non-coplanarity imposed upon the molecular structure of the polyimides by the diamines of formula (I). We theorize that the non-planar nature of the diamines of formula (I) are thought to cause oriented polyimide fibers to exhibit unique packing structures. These packing structures are thought to allow the polyimides to exhibit high tensile strength especially upon drawing of a solution spun fiber by at least two times, but remain poorly crystallized in the two directions perpendicular to the drawing axis. This lack of crystallinity in the two perpendicular directions relative to the drawing axis is thought to be due in part to the non-coplanarity of the diamines of formula (I) which may prevent the formation of crystalline structures in these two directions. Typical commercial high tensile strength aromatic polyamides fibers such as Kevlar (Registered Tradename) are crystalline in these two directions. The lack of crystallinity in the perpendicular direction also is thought to explain why these polyimides give unusually high compression strengths. High compression strengths are atypical for aromatic polyamides such as Kevlar (Registered Tradename) and other high tensile strength fibers. This lack of compressive strength causes these prior art polymers to be subject to fibrillation and fiber bundle unraveling during services and especially under service conditions which require the fibrils, fibers, or fabrics to be flexed perpendicular to the tension axis. The polyimides of the present invention, however, are not subject to fibrillation or unraveling during simple finger flexing as are the prior art aromatic polyamide fibers like Kevlar (Registered Tradename). The fact that the orientation of the rod-like polyimides of the present invention in a drawn fiber is such as to probably interfere with, or partially or wholly preclude crystallization, in the two directions perpendicular to the drawing axis, is thought to be responsible for this unusual behavior.

Copolyimides comprising 1-50 mole percent of repeat units of formula (II) and 99-50 mole percent of repeat units of formula (III) and particularly copolyimides comprising 10-50 mole percent of repeat units of formula (II) and 90-50 mole percent of repeat units of formula (III), also form unique polymers. Conventional polyimides vary widely in their properties. The incorporation of up to 50 mole percent of repeat units of formula (II) with the basis comprising a conventional polyimide or copolyimide will result in new copolyimides which will express not only the properties of the conventional polyimide, but will express some of the properties of the new polyimides. For example, copolyimides can be prepared that have highly crystalline regions made from conventional polyimides and regions of repeat units of formula (II) which will disrupt the crystallinity forming less crystalline, higher compressive strength regions. Thus, copolyimides incorporating up to 50 mole percent of repeat units of formula (II) provides less expensive, high tensile strength copolyimides with high compressive strength regions for improved flex fatigue resistance.

Polyimides and copolyimides comprising 51-100 mole percent of repeat units of formula (II) and 49-0 mole percent of repeat units of formula (III) also represent new unique polyimides and copolyimides. These polyimides and copolyimides will be dominated by the properties of the blocks of repeat units of formula (II) as the extent of this repeat unit is increased from 51 mole percent to 100 mole percent. The inclusion of repeat units of formula (III) will allow the formation of a variety of distinct copolyimides where the type of the repeat units of formula (III) are varied by changed R' and/or Q, i.e., changing the dianhydrides of formula (IV) and the diamines of formula (V) reacted to form the repeat units of formula (III). If the repeat units of formula (III) represent rigid polyimides, then the resulting copolyimides will have hard blocks incorporated therein; while if the repeat units of formula (III) are flexible and relatively non-rigid, then the copolyimides will have flexible amorphous blocks incorporated therein.

The polyimides consisting of repeat units of formula II and III are intended to represent homopolyimides and all manners of copolyimides incorporating at least 1% with 5, 10 and 30% of repeat units of formula II including random, semirandom, tapered or block copolyimides.

Many polyimides and copolyimides of the present invention form gelatinous mixtures in m-cresol or NMP at temperature below their gelation temperature. At temperatures above the gelation temperature, the polyimides or copolyimides of the present invention form very viscous solution in solvents such as m-cresol and NMP. From these hot solutions, the polyimides or copolyimides of the present invention can be spun into fibers or cast into films. The preferred solvent for solution spinning and film formation is m-cresol. NMP is also usable because of its less harmful effect on the ecology, but is not as efficient a solvent as m-cresol. Although only solution spinning has been described here, the other spinning technique such as gel spinning and spin drawing techniques well known in the art, can be utilized to make high tension strength, high compression strength fibers and fabrics from the polyimides and copolyimides of the present invention. In certain situations, polyimide or copolyimide films of the present invention are made by first making a film from polyamide-acid represented by formula (VI) and imidizing the polyamide-acid film with the release of water to the polyimide films. Such a technique is particularly preferred for any polyimide or copolyimide of the present invention that is not soluble in either polar protic or aprotic organic solvents as is the case with the homopolyimides of 100 mole percent of repeat units of formula (II) based on pyromellitic dianhydride.

The polyimides and copolyimides of the present invention also form small liquid crystalline spherical domains from the gel form. These liquid crystalline domains may indicate that certain of the polyimides or copolyimides of the present invention may under some conditions form liquid crystalline polyimides.

Polyimides consisting of 100 mole percent of repeat units of formula (II) wherein the dianhydride is pyromellitic dianhydride, are not soluble in m-cresol or NMP. This polyimide represents an exception to the new class of polyimides made in accordance of the present invention which are generally soluble in these types of solvents. However, copolyimides incorporating up to 50 mole percent of repeat units of either formula (II) or (III) based on pyromellitic dianhydride are soluble in the above stated solvents.

The polyimides and copolyimides of the present invention will have terminal groups, that is groups at the end of a polymer, that will represent the reaction environment and molecular composition of the reacting species that go into manufacturing a given polyimide or copolyimide. If a diamine of formula (I) is used in slight excess from about 1 to 10 mol percent relative to a dianhydride of formula (IV), then the resulting polyimides of 100 mole percent of repeat units of formula (II) will predominately be amino terminated, and the end groups of the polymer will be unreacted amino groups. On the other hand, if a dianhydride of formula (IV) is use in slight excess from about 1 to 10 mol percent relative to a diamine of formula (I), then the resulting polyimides of 100 mole percent of repeat units of formula (II) will predominately be anhydride terminated, and the end groups of the polymer will be unreacted anhydride groups. However, circumstances could arise wherein the polyimides of 100 mole percent of repeat units of formula (II) would be terminated by one amino group and one anhydride or acid group. In an analogous fashion, copolyamides of the present invention can be terminated with anhydride groups, amino groups or some mixture thereof, depending on the exact polymerization conditions and molar ratios of the reacting diamines and dianhydrides.

Alternately, a terminating agent can be employed to force the termination of a growing polyimide or copolyimide. These agents are often used to control the molecular weight of the polymer by reducing the ultimate length of the polymer chains. This technique is well known in the art. These agents can be either anhydrides or amines or reactants reactive therewith. Because these agents are preferably mono-functional, they will cause the growing polymer chain to be capped with the particular agents employed. Anhydrides which are useful as capping agents are selected from the representative and illustrative group consisting of aromatic anhydrides such as phthalic anhydride. Amines which are useful as capping agents are selected from the representative and illustrative group consisting of aromatic amines such as aniline, methyl anilines, dimethyl anilines or naphthylamines.

BEST MODE FOR CARRYING OUT THE INVENTION

Applicants have found that polyimides based on diamines of formula (I) represent a unique class of polyimides which are generally soluble in most polar aprotic organic solvents such as N,N-dimethyl formamide (DMF), acetamide, dimethylsulfoxide (DMSO) and N-methylpyrrolidone (NMP) and in certain polar protic organic solvents such as, in particular, m-cresol, with only limited solubility at ambient to 120° C. in standard halogenated hydrocarbon solvents such as methylene chloride, chloroform, carbontetrachloride, dichloroethanes, trichloroethanes and tertrachloroethanes, have very high film clarity (water white from visual observation and transparent to visible light as measured by a UV spectrophotometer), have very low dielectric constants, have excellent high temperature stability, and are solution spinnable into fibers.

Because these polyimides have the above stated excellent physical properties, along with high glass transition temperatures, they are ideally suited for coating microelectronic components via solution deposition. Films and membranes can also be easily cast from solutions of said polyimides and copolyimides. These polyimides and copolyimides can be also applied as components in molecular composites because of their superior thermal, electrical, physical and mechanical properties.

The polyimides and copolyimides of this invention are preferentially manufactured by the one step pathway, the third pathway described above where refluxing polar aprotic organic solvents such as NMP and certain polar protic organic solvents such as and in particular m-cresol; and particularly preferred said reactions are carried out in the presence of a small amount of isoquinoline (from about 0.1 to 5 percent by weight of solvent). Again we would stress that isoquinoline is an optional additive which only facilitates the polymerization. However, the second pathway is the preferential pathway when the polyimides of this invention are to be used in the manufacture of molecular composites.

The particularly preferred diamine of formula (I) are those wherein each Z represents hydrogen, and each p is 3 and wherein each A, which may be the same or different, is a halogen atom, an alkyl group, a substituted-alkyl group such as a halogenated alkyl group particularly a trifluoromethyl group, a cyano group, an alkyl group, a nitro group, a thioalkyl group, an alkoxy group, an aryl group or a substituted aryl group provided the substituted aryl group does not have a reactive amino functional associated therewith.

Particularly preferred dianhydrides of formula (VII) for polyimides consisting of 100 mole percent of repeat units of formula (II) are selected from the representative and illustrative group consisting of: pyromellitic dianhydride, or dianhydrides of the formula (X) below:

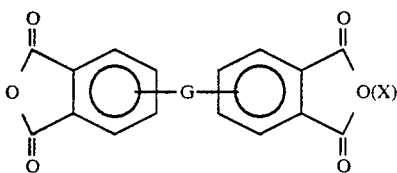

where G is selected from the representative and illustrative group consisting of a covalent or linking bond, an oxygen (O) atom, a carbonyl (CO) group, a sulfonyl $(SO_2)$ group, a $C(CH_3)_2$ group or a $C(CF_3)_2$ group.

Some of these homopolyimides are characterized by very low dielectric constants, very low thermal coefficients of expansion, high clarity (water white by eye inspection or transparent to visible light as measure by a UV spectrometer >80% transparent to light of in the visible region of the electromagnetic spectrum), and excellent thermal stability making them ideally suited as film insulators in the field of microelectronics.

Some of these homopolyimides can also be spun into fibers from organic solutions using solvents such as m-cresol, NMP or other polar aprotic solvents at temperatures above the polyimides gelation temperature. These polyimides can be subsequently drawn to substantially increase their tensile strength, but because of their unique character these fibers have unusually high compressive strength which nearly eliminates fibrillation and other problems normally encountered with high tensile strength polymers.

Copolyimides consisting of 1 to 50 mole percent of repeat units of formula (II), 50–99 mole percent of repeat units of formula (III) are particularly preferred for polymers that have high tensile strength regions with low compressive strength intimately associated on the molecular level with high tensile strength, high compressive strength regions indicative of the properties outlined above for the polyimides consisting of 100 mole percent of repeat units of formula (II) based on diamines of formula (I). These types of polymers should have applications where a fiber composite or other article containing these polymers is subjected to considerable flexing in service. Regions lacking in rigidity in the directions perpendicular to the fiber drawing axis could help in the dissipation of the energy of flexing without composite delamination or stress cracking perpendicular to the axis of the fiber, typical of regions having high crystallinity perpendicular to the drawing axis, like Kevlar.

For copolyimides consisting of 1–50 mole percent of repeat units of formula (II) with the balance being based on repeat units of formula (III), particularly preferred dianhydrides of formula (IV) for repeat units of formula (II) are selected from the representative and illustrative group consisting of: pyromellitic dianhydride, or dianhydrides of the formula (X) below:

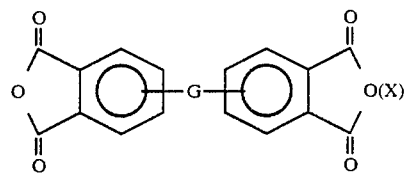

where G is selected from the representative and illustrative group consisting of a covalent or linking bond, an oxygen (O) atom, a carbonyl (CO) group, a sulfone $(SC_2)$ group, a $C(CH_3)_2$ group, or a $C(CF_3)_2$ group such as 3,3',4,4'-biphenyl tetracarboxylic acid dianhydride, 4,4'-oxydiphthalic anhydride or bis(3,4-dicarboxyphenyl) ether dianhydride, 3,3',4,4'-benzophenone tetracarboxylic acid dianhydride, 4,4'-sulfonyldiphthalic anhydride or bis(3,4-dicarboxyphenyl) sulfone dianhydride.

For copolyimides consisting of 1–50 mole percent of repeat units of formula (II) with the balance being based on repeat units of formula (III), particularly preferred dianhydrides of formula (IV) for repeat unit of formula (III) are those dianhydrides of formula (IV) which represent rigid or substantially rigid molecular structures such as the representative and illustrative group consisting of: pyromellitic dianhydride, 2,3,6,7- and 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride or pyridine-2,3,5,6-tetracarboxylic acid dianhydride; and particularly preferred diamines of formula (V) for repeat units of formula (III) are selected from the representative and illustrative group consisting of: p-phenylene diamine (1,4-diaminobenzene), 4,4'-biphenyl diamine or benzidine, 4,4'-diaminodiphenylmethane, 4,4'diaminobiphenyl ether, 4,4'-diaminodiphenyl thioether, 4,4'-diaminodiphenylsulphone, 4,4'-diaminobenzophenone or 4,4'-diaminodiphenylurea.

Co-polyimides consist of 51–100 mole percent of repeat units of formula (II) and 0–49 mole percent of repeat units of formula (III) are particularly preferred for polymers that require high clarity, good solubility and excellent electrical properties for use as film coatings in microelectronics. These films should also find considerable application in the areas of membranes and molecular composites.

For polyimides consisting of 51–100 mole percent of repeat units of formula (II) and 0–49 mole percent of repeat units of formula (III), particularly preferred dianhydrides of formula (IV) for repeat units of formula (II) are selected from the representative and illustrative group consisting of dianhydrides of formula (X)

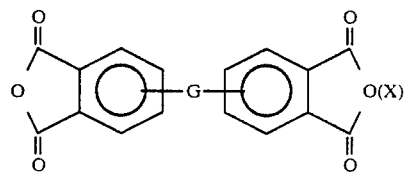

where G is selected from the representative and illustrative group consisting of a linking bond, an O atom, a CO group, a SO$_2$ group, a C(CH$_3$)$_2$ group, a C(CF$_3$)$_2$ group or a Si(C$_2$H$_5$)$_2$ group.

Particularly preferred dianhydrides of formula (IV) for repeat unit of formula (III) are selected from the representative and illustrative group consisting of: pyromellitic dianhydride, 2,3,6,7-and 1,2,5,6-naphthalenetetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride; and particularly preferred diamines of formula (V) for repeat units of formula (III) are selected from the representative and illustrative group consisting of: phenylene diamine viz. 1,4-diaminobenzene, ether 4,4'-diaminodiphenylmethane, 4,4'-diaminobiphenyl ether, 4,4'-diaminodiphenyl thioether, 4,4'-diaminodiphenylsulphone, 2,2'-diaminobenzophenone or 4,4'-diaminodiphenylurea.

The invention will be better understood by reference to the following illustrative and representative examples:

One-Step Procedure for Homopolyimides

EXAMPLE 1

This example illustrates the preparation of a homopolyimide of pyromellitic dianhydride (PMDA) and 2,2'-bis(trifluoromethyl) benzidine (BTMB).

1.09 milli moles of PMDA was added to a stirred solution of 1.09 milli moles of BTMB in 6.3 grams of m-cresol (solids content 10% weight per weight of solvent) containing 0.06 grams of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. The homopolyimide precipitated from the solution during polymerization because of a lack of solubility. The polymer was collected by filtration, washed with ethanol, and dried under reduced pressure at 150° C. for 24 hours.

Polymer properties: T(−5%)/air (temperature at which a 5% weight loss occurred in a thermogravimetric analysis (TGA) spectrum under an air atmosphere) = 555° C.; and T(−5%)/N$_2$ (temperature at which a 5% weight loss occurred in a thermogravimetric analysis (TGA) spectrum under a nitrogen atmosphere) = 575° C.

EXAMPLE 2

This example illustrates the preparation of a homopolyimide of 3,3',4,4'-benzophenone tetracarboxylic dianhydride (BTDA) and 2,2'bis(trifluoromethyl) benzidine (BTMB).

0.93 milli moles of BTDA was added to a stirred solution of 0.93 milli moles of BTMB in 5.4 grams of m-cresol (solids content 10% weight per weight of solvent) containing 0.06 grams of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] (where [n] is the intrinsic viscosity) at 30.1° C. in m-cresol = 1.62 dl/g; T$_g$ = N/A; T(−5%)/air = 550° C.; and T(−5%)/N$_2$ = 560° C.

EXAMPLE 3

This example illustrates the preparation of a homopolyimide of 4,4'-oxydiphthalic anhydride (ODPA) and 2,2'bis(trifluoromethyl) benzidine (BTMB).

1.09 milli moles of ODPA was added to a stirred solution of 1.09 milli moles of BTMB in 6.21 grams of m-cresol (solids content 10% weight per weight of solvent) containing 0.06 grams of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol = 1.1 dl/g; T$_g$ = 275° C.; T(−5%)/air = 570° C.; and T(−5%)/N$_2$ = 580° C.

EXAMPLE 4

This example illustrates the preparation of a homopolyimide of 3,3',4,4'-diphenylsu tetracarboxylic dianhydride (DSDA) and 2,2'bis(trifluoromethyl) benzidine (BTMB).

0.93 milli moles of BTDA was added to a stirred solution of 0.93 milli moles of BTMB in 5.72 grams of m-cresol (solids content 10% weight per weight of solvent) containing 0.06 grams of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol = 1.0 dl/g; T$_g$ = 320° C.; T(−5%)/air = 540° C.; T(−5%)/N$_2$ = 51° C.; and UV data - transparency onset = 375nm and maximum transparency = 85%.

EXAMPLE 5

This example illustrates the preparation of a homopolyimide of 3,3',4,4'-biphenyl tetracarboxylic dianhydride (BPDA) and 2,2'bis(trifluoromethyl) benzidine (BTMB).

1.25 milli moles of BTDA was added to a stirred solution of 1.25 milli moles of BTMB in 6.9 grams of m-cresol (solids content 1% weight per weight of solvent) containing 0.08 grams of isoquinoline (optional) under N$_2$ at ambient temperature. After the solution was stirred for 3 hours, it was heated to near 200° C. and maintained at that temperature for hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol=4.9 dl/g; T(−5%)/air=600° C.; T(−5%)/N$_2$=600° C.; and UV data - transparency onset=390nm and maximum transparency=84%.

EXAMPLE 6

This example illustrates the preparation of a homopolyimide of 2,2'-bis(dicarbonylphenyl) hexafluoropropane dianhydride (6FDA) and 2,2'bis(trifluoromethyl) benzidine (BTMB).

4.68 milli moles of BTDA was added to a stirred solution of 4.68 milli moles of BTMB in 32.2 grams of m-cresol (solids content 10% weight per weight of solvent) containing 0.2 grams of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol=1.42 Dl/g; T$_g$=320° C.; T(−5%)/air=530° C.; T(−5%)/N$_2$=540° C.; and UV data—transparency onset=350 nm and maximum transparency=90%.

One Step Procedure for Co-Polyimides

EXAMPLE 7

This example illustrates the preparation of a co-polyimide based on 3,3',4,4'-benzophenone tetracarboxylic acid dianhydride (BTDA), 2,2'-bis(trifluoromethyl) benzidine (BTMB) and 4,4'-diaminodiphenyl ether (DDE).

1.86 milli moles of BTDA added to a stirred solution of 0.93 milli moles of BTMB and 0.93 milli moles of DDE in 9.8 g of m-cresol (solids content 10% weight per weight of solvent) containing 0.08 grams of isoquinoline (optional) under N$_2$ at ambient temperature. After the solution was stirred for 1 hour, it was heated to near 200° C. and maintained at that temperature for 3 hours. After cooling to room temperature, 0.93 milli moles of diaminodiphenyl ether was added to the oligomer solution. The mixture was reheated to near 200° C. and maintained at that temperature for 3 hours. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol=0.35 dl/g.

EXAMPLE 8

This example illustrates the preparation of a co-polyimide based on 3,3',4,4'-biphenyl tetracarboxylic dianhydride (BPDA), pyromellitic dianhydride (PMDA) and 2,2'-bis(trifluoromethyl) benzidine (BTMB).

0.78 milli moles of BPDA and 0.78 milli moles of PMDA was added to a stirred solution of 1.56 milli moles of BTMB in 8.1 g of m-cresol (solids content 10% weight per weight of solvent) containing 0.08 grams of isoquinoline (optional) under N$_2$ at ambient temperature. After the solution was stirred for 1 hour, it was heated to near 200° C. and maintained at that temperature for 3 hours. After cooling to room temperature, 0.93 milli moles of diaminodiphenyl ether was added to the oligomer solution. The mixture was reheated to near 200° C. and maintained at that temperature for 3 hours. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol=2.30 dl/g; and T(−5%)/N$_2$=540° C.

EXAMPLE 9

This example illustrates the preparation of a co-polyimide based on 3,3+,4,4'-biphenyl tetracarboxylic dianhydride (BPDA), 2,2'-bis(trifluoromethyl) benzidine (BTMB) and paraphenylene diamine (PPDA).

0.4 grams of BPDA was added to a stirred solution of 0.348 grams of BTMB and 0.029 grams of paraphenylenediamine in 7.8 g of m-cresol (solids content 10% weight per weight of solvent) containing 0.08 grams of isoquinoline ( optional) under N$_2$ at ambient temperature. After the solution was stirred for 1 hour, it was heated to near 200° C. and maintained at that temperature for 3 hours. After cooling to room temperature, 0.93 milli moles of diaminodiphenyl ether was added to the oligomer solution. The mixture was reheated to near 200° C. and maintained at that temperature for 3 hours. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol=2.75 dl/g.

Two-Step Procedure for Homopolyimides

EXAMPLE 10

This example illustrates the preparation of a homopolyimide of pyromellitic dianhydride (PMDA) and 2,2'bis(trifluoromethyl) benzidine (BTMB).

1.24 milli moles of (PMDA) added to a stirred solution of 1.24 milli moles of BTMB in 6.03 grams of NMP (solids content 10% weight per weight of solvent) under N$_2$ at ambient temperature. After the solution was stirred for 24 hours, 5.0 milli moles of pyridine and 5.0 milli moles of acetic anhydride were added. After the solution was stirred for 24 hours, it was diluted with 8 ml of NMP and then added to 1 liter of vigorously stirred 95% ethanol. The polyimide was collected by filtration, washed with ethanol, and then dried at 150° C. under reduced pressure for 24 hours.

Polymer properties: [n] at 30.1° C. in m-cresol=0.28 dl/g of the intermediate polyamide-acid ; T(−5%)/air=555° C.; and T(−5%)/N$_2$=575° C.

EXAMPLE 11

This example illustrates the preparation of a homopolyimide of 3,3',4,4'Benzophenone tetracarboxylic acid dianhydride (BTDA) and 2,2'-bis(trifluoromethyl) benzidine (BTMB).

1 55 milli moles of (BTDA) added to a stirred solution of 1.55 milli moles of BTMB in 9.0 grams of NMP (solids content 10% weight per weight of solvent) under N$_2$ at ambient temperature. After the solution was stirred for 24 hours, 3.41 milli moles of pyridine and 3.41 milli moles of acetic anhydride were added. After the solution was stirred for 24 hours, it was diluted with 8 ml of NMP and then added to 1 liter of vigorously stirred 95% ethanol. The polyimide was collected by filtration, washed with ethanol, and then dried at 150° C. under reduced pressure for 24 hours.

Polymer properties: [n] at 30.1° C. in m-cresol=0.84 dl/g of the intermediate polyamide-acid; T(−5%)/air=550° C.; and T(−5%)/N$_2$=560° C.

EXAMPLE 12

This example illustrates the preparation of a homopolyimide of 4,4'oxydiphthalic anhydride (ODPA) and 2,2'-bis(trifluoromethyl) benzidine (BTMB).

1.56 milli moles of (ODPA) added to a stirred solution of 1.56 milli moles of BTMB in 5.57 grams of NMP (solids content 15% weight per weight of solvent) under N$_2$ at ambient temperature. After the solution was stirred for 24 hours, 2.67 milli moles of pyridine and 2.67 milli moles of acetic anhydride were added. After the solution was stirred for 24 hours, it was diluted with 8 ml of NMP and then added to 1 liter of vigorously stirred 95% ethanol. The polyimide was collected by filtration, washed with ethanol, and then dried at 150° C. under reduced pressure for 24 hours.

Polymer properties: [n] at 30.1° C. in m-cresol=0.57 dl/g; T$_g$=275° C.; T(−5%)/air=570° C.; and T(−5%)/N$_2$=580° C.

EXAMPLE 13

This example illustrates the preparation of a homopolyimide of 3,3',4,4'diphenylsulfone tetracarboxylic acid dianhydride (DSDA) and 2,2'-bis(trifluoromethyl) benzidine (BTMB).

1.56 milli moles of (DSDA) added to a stirred solution of 1.56 milli moles of BTMB in 9.53 grams of NMP (solids content 10% weight per weight of solvent) under N$_2$ at ambient temperature. After the solution was stirred for 24 hours, 4.7 milli moles of pyridine and 4.7 milli moles of acetic anhydride were added. After the solution was stirred for 24 hours, it was diluted with 8 ml of NMP and then added to 1 liter of vigorously stirred 95% ethanol. The polyimide was collected by filtration, washed with ethanol, and then dried at 150° C. under reduced pressure for 24 hours.

Polymer properties: [n] at 30.1° C. in m-cresol=0.68 dl/g; T$_g$=320° C.; T(−5%)/air=540° C.; and T(−5%)/N$_2$=515° C.

Fiber Spinning and Drawing

EXAMPLE 14

This example illustrates the preparation of a homopolyimide of 3,3',4,4'-biphenyl tetracarboxylic dianhydride (BPDA) and 2,2'bis(trifluoromethyl) benzidine (BTMB) and the process for spinning and drawing the polyimide to form a unique fiber with crystallinity in the direction of drawing and no cystallinity in the two perpendicular directions are evidenced by a X-Ray defraction pattern.

1.25 milli moles of BTDA was added to a stirred solution of 1.25 milli moles of BTMB in 6.9 grams of m-cresol (solids content 10% weight per weight of solvent) containing 0.08 grams of isoquinoline (optional) under N$_2$ at ambient temperature. After the solution was stirred for 3 hours, it was heated to near 200° C. and maintained at that temperature for 3 hours. During this time, the water of imidization was allowed to distill from the reaction mixture. After the solution was allowed to cool to ambient temperature, it was diluted with 10 ml of m-cresol and then slowly added to 1 liter of vigorously stirred 95% ethanol. The polymer that precipitated was collected by filtration, washed with ethanol, and dried under reduced pressure at 150° C. for 24 hours.

Polymer properties: [n] at 30.1° C. in m-cresol=4.9dl/g; T(−5%)/air=600° C.; and T(−5%)/N$_2$=600° C.

The recovered polyimide was redissolved in 6.3 grams of m-cresol. The solution forms a gel at temperatures below approximately 120° C. The fibers were spun from a normal type spinning apparatus which comprises a bomb, a piston, a spinneret, a coagulating bath and a take up wheel. The bomb was heated to 130° C. to take the polyimide solution above the gelation temperature. A force was applied to the piston and the fibers were spun into a coagulation bath comprising a 1 to 1 mixture of ethanol and water. The fiber was then taken up by a take up wheel with a draw ratio between 100% and 200%. The resulting fiber was dried under vacuum at 150° C. for five hours. The dried fiber was then heat treated at 450° C.

Fiber properties: tenacity of the fiber before heat treatment was 2.0 g/denier; the tenacity of the fiber after heat treatment was 5 to 6 g/denier; the X-Ray defraction pattern showed that the fiber was crystalline only in the direction of drawing, that is, the fiber was crystalline in the fiber direction and non-crystalline in the non fiber directions; and the heat treated fiber had a higher degree of crystallinity than the non heat treated fiber.

While in accordance with the patent statutes, a preferred embodiment and best mode has been presented, the scope of the invention is not limited thereto, but rather is measured by the scope of the attached claims.

What is claimed is:

1. A polyimide which consists of 1 to 100 mole percent of the structural elements of the formula (II)

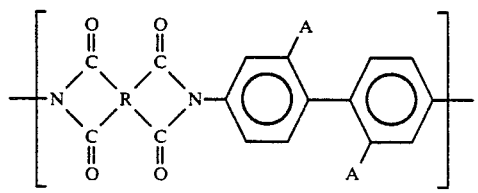

where R is a tetravalent organic radical, each A is selected from the group consisting of a halogenated alkyl group, an aryl group and a substituted-aryl group.

2. A polyimide according to claim 1 wherein A is a halogenated alkyl group.

3. A polyimide according to claim 2 wherein said halogenated alkyl group is trifluoromethyl.

4. A polyimide according to claim 1 wherein said polymer consists of 100 mole percent of repeat unit formula (II).

5. A polyimide according to claim 4 wherein A is a halogenated alkyl group.

6. A polyimide according to claim 5 wherein said halogenated alkyl group is trifluoromethyl.

7. A polyimide according to claim 1 wherein said polyimide is characterized by complete solubility in m-cresol or NMP, by UV transparency from about 65% to about 100% at 375 nm, and by a 5% weight loss at a temperature from about 500° C. to about 600° C.

8. A polyimide according to claim 4 wherein said polyimide is characterized by complete solubility in m-cresol or NMP, by UV transparency from about 65% to about 100% at 375 nm, by low dielectric constant, and by excellent thermal stability as evidenced by a 5% weight loss at a temperature from about 500° C. to about 600° C.

9. A polyimide of claim 1 characterized by the ability to be drawn to form fibers of high tensile strength, excellent resistance to fibrillation, high compressive strength and high temperature stability, said fiber being oriented in at least one direction by being drawn at least two times and being crystalline in the drawing direction and partially or wholly non-crystalline in the direction perpendicular to the drawing direction.

10. A film formed from a polyimide consisting of 1 to 100 mole percent of repeat units of formula (II)

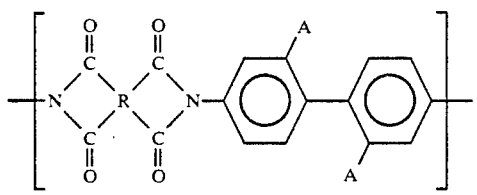

where R is a tetravalent organic radical, each A is selected from the group consisting of a halogenated alkyl group, an aryl group and a substituted-aryl group, said polyimide characterized by complete solubility in m-cresol, by UV transparency from about 65% to about 100% at 375 nm, a low dielectric constant, and by excellent thermal stability as evidenced by a 5% weight loss at a temperature from about 500° C. to about 600° C.

11. A polyimide according to claim 10 wherein A is a halogenated alkyl group.

12. A polyimide according to claim 69 wherein said halogenated alkyl group is trifluoromethyl.

13. A polyimide according to claim 10 wherein said polymer consists of 100 mole percent of percent unit formula (II).

14. A polyimide according to claim 13 wherein A is a halogenated alkyl group.

15. A polyimide according to claim 14 wherein said halogenated alkyl group is trifluoromethyl.

16. A fiber formed from a polyimide consisting of 1 to 100 mole percent of repeat units of formula (II)

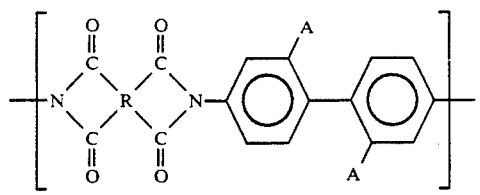

where R is a tetravalent organic radical, each A is selected from the group consisting of a halogenated alkyl group, an aryl group and a substituted-aryl group, said polyimide characterized by complete solubility in m-cresol, by UV transparency from about 65% to about 100% at 375 nm, a low dielectric constant, and by excellent thermal stability as evidenced by a 5% weight loss at a temperature from about 500° C. to about 600° C., said fiber oriented in one direction by being drawn at least two times in said direction and being characterized by high tensile strength in the draw direction, excellent resistance to fibrillation, a high degree of crystallinity in the drawing direction and partially or entirely non-crystalline in a direction perpendicular to the drawing direction.

17. A polyimide according to claim 16 wherein A is a halogenated alkyl group.

18. A polyimide according to claim 17 wherein said halogenated alkyl group is trifluoromethyl.

19. A polyimide according to claim 16 wherein said polymer consists of 100 mole percent of repeat unit formula (II).

20. A polyimide according to claim 19 wherein A is a halogenated alkyl group.

21. A polyimide according to claim 20 wherein said halogenated alkyl group is trifluoromethyl.

22. An elastomeric or resinous fiber composite comprising fibers of a polyimide consisting of 1 to 100 mole percent of repeat units of formula (II)

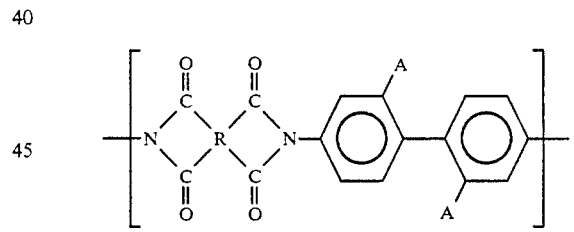

where R is a tetravalent organic radical, each A is selected from the group consisting of a halogenated alkyl group, an aryl group and a substituted-aryl group, said polyimide characterized by complete solubility in m-cresol, by UV transparency from about 65% to about 100% at 375 nm, a low dielectric constant, and excellent thermal stability as evidenced by a 5% weight loss at a temperature from about 500° C. to about 600° C., said fiber oriented in one direction by being drawn at least two times in said direction and being characterized by high tensile strength in the draw direction, excellent resistance to fibrillation, a high degrees of crystallinity in the drawing direction and partially or entirely non-crystalline in a direction perpendicular to the drawing direction.

* * * * *